(12) United States Patent
Boettinger et al.

(10) Patent No.: US 6,783,053 B2
(45) Date of Patent: Aug. 31, 2004

(54) CLAMPING MECHANISM FOR CLAMPING SHEET METAL WORKPIECES

(75) Inventors: Volker Boettinger, Gechingen (DE); Karl-Heinz Hennig, Weil der Stadt (DE); Wolfgang Keller, Ammerbuch (DE); Achim Maeutner, Wildberg (DE); Hans Schikotanz, Gaeufelden (DE); Roland Windheim, Magstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/360,884

(22) Filed: Feb. 7, 2003

(65) Prior Publication Data

US 2004/0026841 A1 Feb. 12, 2004

(30) Foreign Application Priority Data

Feb. 8, 2002 (DE) ......................................... 102 05 541

(51) Int. Cl.[7] .............................................. B23K 37/04
(52) U.S. Cl. ....................... 228/44.3; 228/49.4; 219/161
(58) Field of Search ................................. 228/212, 213, 228/44.3, 44.5, 44.7, 49.4; 219/158, 161, 121.72; 269/86–286

(56) References Cited

U.S. PATENT DOCUMENTS

| | | | | |
|---|---|---|---|---|
| 3,681,834 A | * | 8/1972 | Seidefaden ................... | 269/45 |
| 4,129,291 A | * | 12/1978 | Kato et al. ...................... | 269/73 |
| 4,174,917 A | * | 11/1979 | Brower ......................... | 408/62 |
| 4,479,639 A | * | 10/1984 | Kane ............................. | 269/6 |
| 4,813,260 A | * | 3/1989 | Strybel ........................ | 72/316 |
| 5,190,204 A | * | 3/1993 | Jack et al. .................... | 228/5.7 |
| 5,632,665 A | * | 5/1997 | Yanai .......................... | 445/68 |
| 5,743,539 A | * | 4/1998 | VanderPol et al. ............ | 279/58 |
| 5,934,688 A | * | 8/1999 | VanderPol et al. ............ | 279/58 |
| 5,964,569 A | * | 10/1999 | Lee ............................. | 414/754 |
| 6,386,533 B1 | * | 5/2002 | Chakrabarti et al. .......... | 269/43 |
| 2004/0026841 A1 | * | 2/2004 | Boettinger et al. ......... | 269/216 |

FOREIGN PATENT DOCUMENTS

| | | |
|---|---|---|
| EP | 0 909 607 | 10/2001 |
| GB | 2076321 A | * 12/1981 |

* cited by examiner

*Primary Examiner*—Kiley Stoner
(74) *Attorney, Agent, or Firm*—Kenyon & Kenyon

(57) ABSTRACT

A clamping mechanism for locating sheet metal components includes a carrier plate and a clamping jaw swivel-mounted in relation to the carrier plate, the sheet metal components being clamped in contact areas between the carrier plate and the clamping jaw. The carrier plate is bolted to a support element, which is fixed to a base unit. Between the carrier plate and the support element there is an intermediate plate, which is positioned in relation to the carrier plate by a first set of locating pins and in relation to the support element by a second set of locating pins. The use of an intermediate plate with modified orientation of the locating pins may enable the carrier plate together with the component contact areas provided thereon to be displaced in relation to the support element.

5 Claims, 3 Drawing Sheets

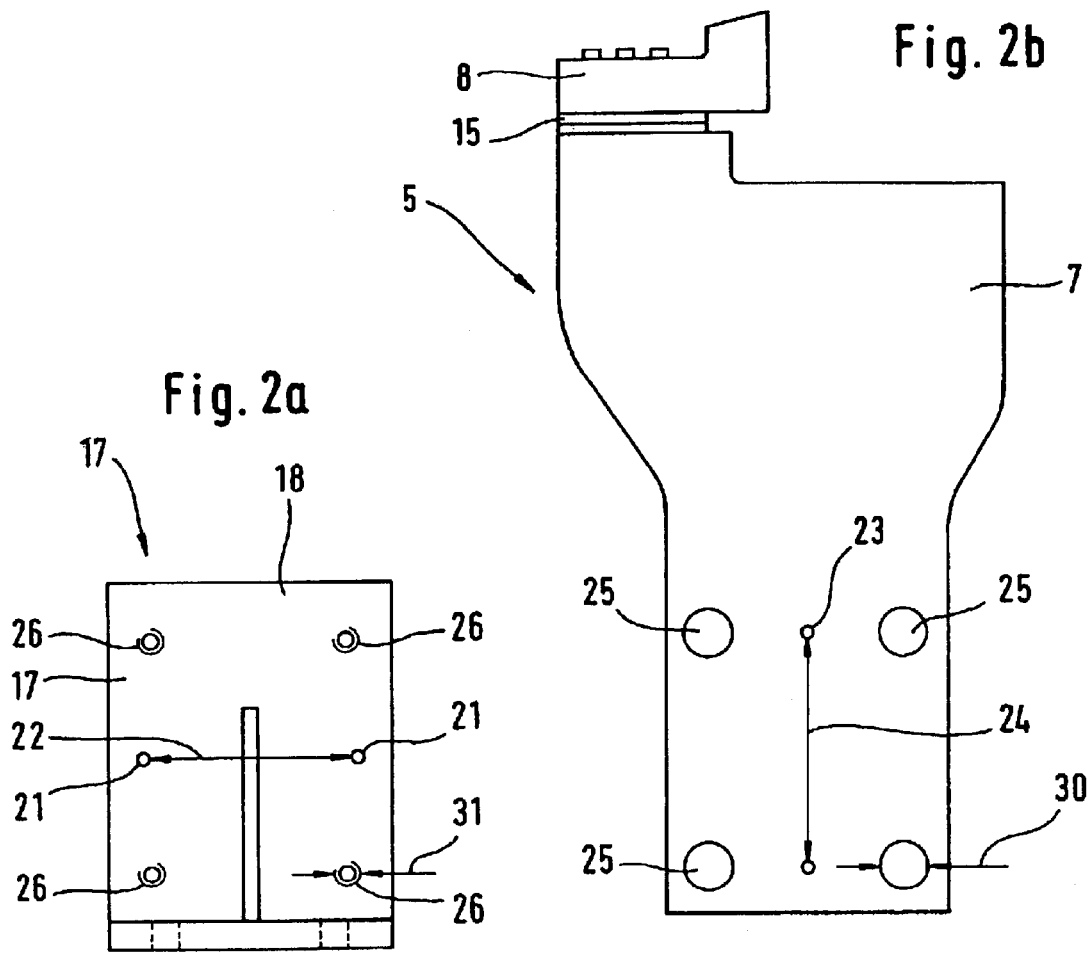
Fig. 2a
Fig. 2b
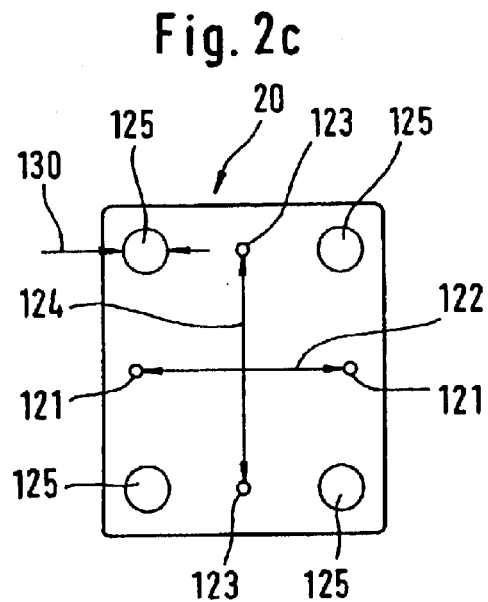
Fig. 2c
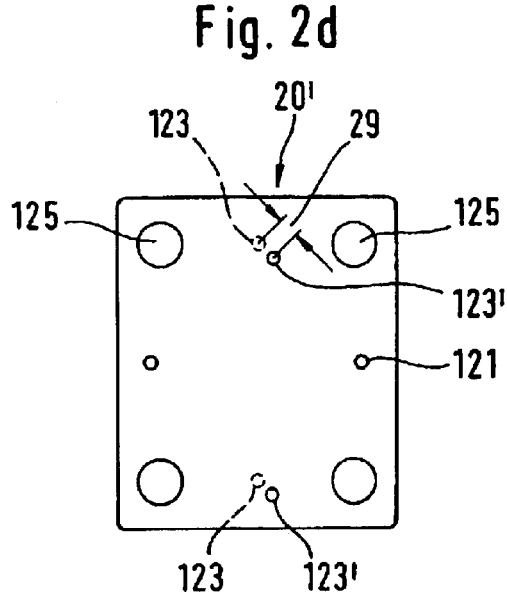
Fig. 2d

CLAMPING MECHANISM FOR CLAMPING SHEET METAL WORKPIECES

CROSS-REFERENCE TO RELATED APPLICATIONS

The present application claims priority to Application No. 102 05 541.6, filed in the Federal Republic of Germany on Feb. 8, 2002, which is expressly incorporated herein in its entirety by reference thereto.

FIELD OF THE INVENTION

The present invention relates to a clamping mechanism for locating and clamping sheet metal workpieces.

BACKGROUND INFORMATION

European Published Patent Application No. 0 909 607 describes a clamping mechanism for the clamping of sheet metal parts. Such clamping mechanisms are used, for example, for the precisely positioned fixing of two sheet metal parts during spot welding, especially in the process of manufacturing vehicle bodies. The clamping mechanism includes two contact surfaces, between which the sheet metal parts are: clamped. The first contact surface is part of a carrier plate, which is rigidly bolted to a fixed support element, which is fixed, for example to a clamping frame or a base plate. The second contact surface is situated on a clamping jaw, which is swivel-mounted on a carrier member connected to the carrier plate. By swivelling the clamping jaw, the clamping mechanism can be brought from a clamping position, in which the contact surfaces on carrier plate and clamping jaw are situated directly opposite one another, clamping the sheet metal parts that are to be joined between the two contact surfaces, into an open position, in which the contact area of the clamping jaw is distanced from the contact area of the carrier plate, so that the sheet metal parts can be removed from the clamping mechanism. The carrier member, to which the swivelling clamping jaw is fixed, is bolted to the carrier plate, so that the relative position of the clamping jaw in relation to the carrier plate is invariably fixed. When converting the clamping mechanism, the relative position of the corresponding contact surfaces therefore remains unchanged, so that no time-consuming adjustment of the clamping jaw in relation to the carrier plate is necessary. On the other hand, the clamping mechanism permits adjustment of the overall unit arranged on the carrier plate in relation to the support element (and hence in relation to the clamping frame or the base plate). The through-holes, through which the connecting bolts are passed for attaching the carrier plate to the support element, have a diameter larger than that of the bolts, so that the carrier plate can be displaced in relation to the support element in a plane perpendicular to the bolting direction. For fixing the carrier plate in the desired position relative to the support element, shims are provided, which are inserted between carrier plate and support element.

The clamping mechanism described in European Published Patent Application No. 0 909 607 thereby permits a joint adjustment of a plurality of contact areas situated a fixed distance from one another, precise adjustment being effected by displacement of the carrier plate, carrying the contact areas, in relation to the support element. The adjustment by shims which are inserted between opposing stop surfaces on carrier plate and support element has the disadvantage, however, that these stop surfaces must be machined with great accuracy in order to achieve a reproducible adjustment, which is associated with high machining costs. Furthermore, a number of individual components, which have to be produced with great accuracy, are needed for such an adjustment, which makes the adjustment expensive. Finally, the contact surface in the area where the carrier plate rests on the support element is relatively small, which reduces the stability of the clamping mechanism.

It is an object of the present invention to provide a clamping mechanism which avoids the forgoing disadvantages.

SUMMARY

The above and other beneficial objects of the present invention are achieved by providing a clamping mechanism as described herein.

According to one aspect of the present invention, the carrier plate is attached to the support element by an intermediate plate arranged between carrier plate and support element. The intermediate plate and the carrier plate are provided with a first set of very precisely positioned holes for a first set of locating pins, by which the intermediate plate is precisely positioned in relation to the carrier plate. In addition, the intermediate plate and the support element are provided with a second set of very precisely positioned holes for a second set of locating pins, by which the intermediate plate is precisely positioned in relation to the support element. The locating pin holes on support element and carrier plate are arranged in a firmly predefined standard position, so that different support elements and carrier plates have an identical alignment of the holes. The position (or the offset) of the holes on the intermediate plate, on the other hand, is adapted to suit the actual application: if the carrier plate—due to wear, for example, or a geometric variation in the body parts to be joined—is to be offset in relation to the support element, the intermediate plate originally provided between carrier plate and support element is replaced by a modified intermediate plate, the hole pattern of which has the required offset in relation to the hole pattern of the original intermediate plate. The carrier plate may thus be displaced quickly, easily and with high, reproducible accuracy in relation to the support element without individual modification or adjustment of the stop surfaces. The assembly including carrier plate, intermediate plate and support element aligned by the locating pins is located by fixing bolts.

The use of individually perforated intermediate plates means that, in contrast to the conventional clamping mechanism, the clamping mechanism according to the present invention may dispense with the use of shims, thereby reducing the number of individual components needed for adjustment of the clamping mechanism.

Furthermore, manufacture of the intermediate plates and carrier plates may be rendered very simple and cost-effective if these parts are cut out from plate material of the required thickness, by laser cutting, for example. The blanks cut in this manner need not be subjected to further machining in their opposing contact areas (apart from the introduction of holes or threads and any deburring of the edges that might be necessary, depending on the method of cutting used). In this, manner, considerable cost advantages may be achieved in comparison to the manufacture of the conventional clamping mechanisms, particularly since the high-precision machining of the contact surfaces between carrier plate and support element may no longer be necessary.

The carrier plate may be formed in two pieces and may include a body to be connected to the support element and a clamping element bolted to the body and carrying the first contact area. Shims may be inserted between carrier plate and clamping element, in order to adjust the position of the contact area on the carrier plate to the position of the contact area on the clamping jaw. A facility for individual adjustment of the clamping area may be advisable where a plurality of different contact areas are arranged on one carrier plate, which in the course of an initial adjustment of the clamping mechanism need to be individually adjusted to the areas of the sheet metal parts arranged opposite them.

The clamping mechanism according to the present invention may be suitable for clamping in the manufacture of prototype and pre-production vehicles. Its facility for rapid, cost-effective manufacture may provide that this clamping mechanism may be inexpensively adapted to any change in the components to be joined, in the case of minor modifications, by shifting an existing carrier plate relative to the support structure using an intermediate plate with a modified hole pattern, or in the case of more major modifications by cutting out a new carrier plate, which is then bolted onto the support structure using an existing intermediate plate. In this case, the carrier plate may be designed in one piece, in order to save the additional cost associated with the manufacture of a connecting area between body and clamping element. In this application, furthermore, the clamping jaw may be closed and opened manually, thereby avoiding the costs of an expensive, automated control mechanism.

The present invention will be explained in more detail below with reference to exemplary embodiments represented in the Figures.

BRIEF DESCRIPTION OF THE DRAWINGS

FIG. 2a illustrates an aspect of a stop plate of a support element.

FIG. 2b illustrates an aspect of a carrier plate.

FIG. 2c illustrates an aspect of an intermediate plate.

FIG. 2d illustrates an aspect of an alternative development of the intermediate plate illustrated in FIG. 2c.

DETAILED DESCRIPTION

Figure 1:
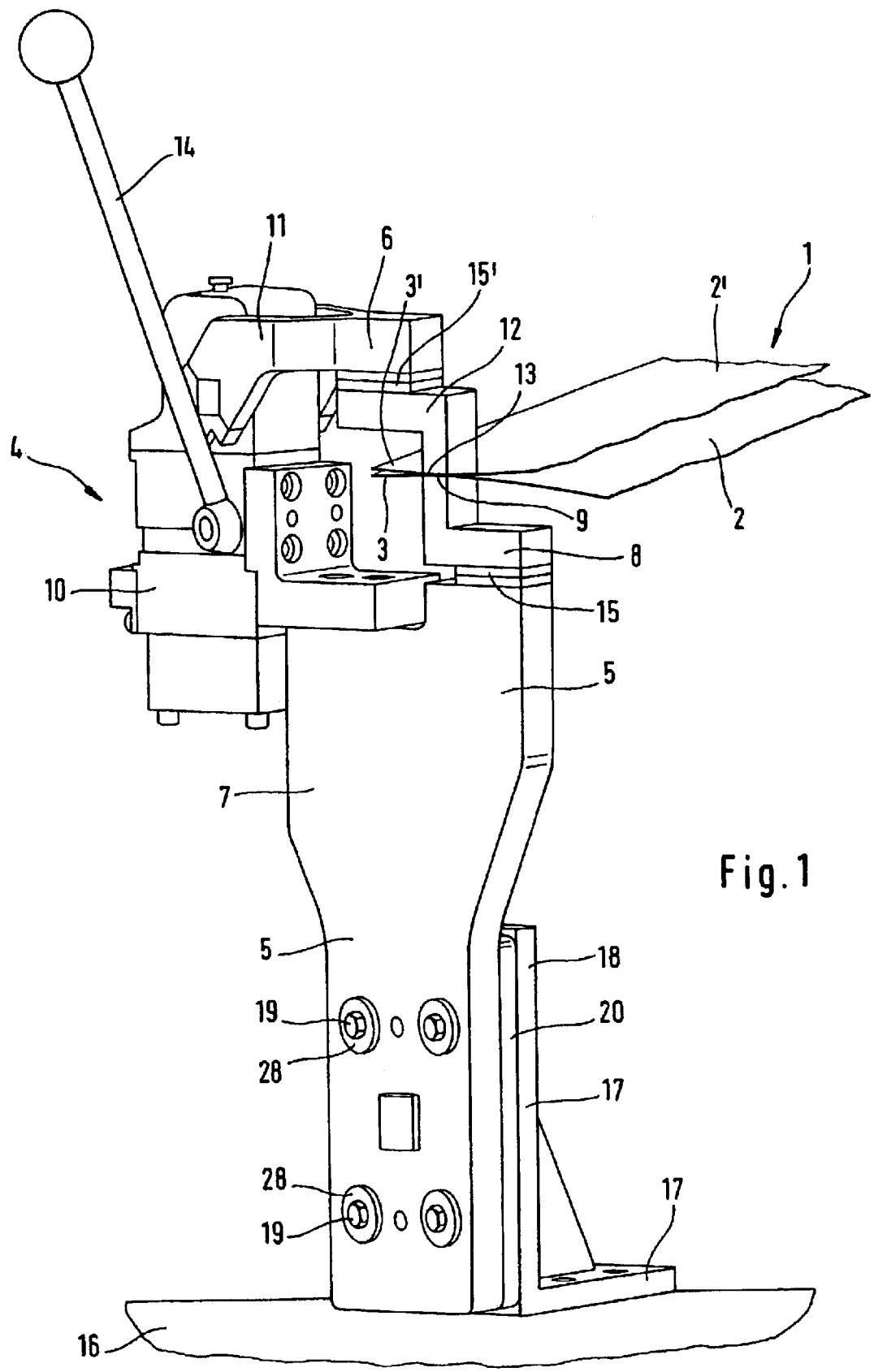
FIG. 1 is a perspective view of a clamping mechanism according to the present invention.

FIG. 1 illustrates a section 1 of two sheet metal components 2, 2', which form part of a vehicle body-in-white and which are to be spot welded to one another in a defined position in the area of their flanges 3, 3'. In order to locate the two components 2, 2' during this welding process, the flanges 3, 3' are firmly clamped in the desired relative position by a clamping mechanism 4. In so doing the flanges 3, 3' are compressed between a fixed carrier plate 5 and a moveable clamping jaw 6 and thereby clamped in this relative position. The components 2, 2' thus located are then welded together in joining areas outside the clamping mechanism 4.

The carrier pate 5 in FIG. 1 is of two-piece configuration and includes a body 7 together with a clamping element 8 bolted thereto and having a first contact area 9, on which the flange 3 of the sheet metal part 2 rests. Fixed to the carrier plate 5 is a carrier member 10, which carries the swivelling clamping jaw 6. The clamping jaw 6 is of two-piece configuration and includes a clamping jaw body 11 together with a clamping jaw clamping element 12 bolted thereto and having a second contact area 13, which presses the flange 3' of the sheet metal part 2' on to the flange 3 opposite it. By a lever 14, the clamping jaw 6 may be brought from a clamping position, in which the flanges 3, 3' are clamped between the two contact areas 9, 13, into an opening position, in which the clamping jaw 6 is swivelled away from the carrier plate 5, so that the components 2, 2' may be removed from the clamping mechanism 4.

Shims 15, 15' may be inserted between body 7 and clamping element 8 of the carrier plate 5 and between body 11 and clamping element 12 of the clamping jaw 6, in order to adjust the precise position of the contact areas 9, 13 in relation to the body 7 in the course of an initial adjustment of the clamping mechanism 4.

For fastening the clamping mechanism 4 to a base unit 16 (for example, a clamping frame), which serves for locating the body parts to be joined in their assembly position and which may carry a plurality of further clamping mechanisms, the clamping mechanism 4 includes a support element 17 having a stop plate 18, to which the carrier plate 5 is fixed by fixing bolts 19. An intermediate plate 20 which—as will be explained below—permits highly accurate and reproducible positioning of the carrier plate 5 in relation to the support element 17 (and hence in relation to the base unit 16), is arranged between the carrier plate 5 and the stop plate 18.

FIGS. 2a to 2c illustrate aspects of the stop plate 18 of the support element 17, the carrier plate 5 and the intermediate plate 20. A first set of locating holes 21, into which locating pins are inserted, is provided on the stop plate 18 of the support element 17. The intermediate plate 20 is correspondingly provided with a first set of locating holes 121, the diameter and relative spacing 122 of which correspond to the diameter and the relative spacing 22 of the locating holes 21 on the stop plate 18, so that the intermediate plate 20 may be positioned in a defined orientation in relation to the stop plate 18 by the locating pins. Furthermore, a second set of locating holes 123, the diameter and relative spacing 124 of which correspond to the diameter and relative spacing 24 of a second set of locating holes 23 on the carrier plate 5, is provided on the intermediate plate 20. By a second set of locating pins, it is thereby possible to position the, carrier plate 5 in a defined orientation in relation to the intermediate plate 20. This precisely aligned assembly including stop plate 18, intermediate plate 20 and carrier plate 5 is joined by fixing bolts 19, which are passed through washers 28, the through-holes 25, 125 and the tapped holes 26. Stop plate 18, intermediate plate 20 and carrier plate 5 have an extensive area of overlap, which may give the clamping unit 4 great stability.

If the carrier plate 5 together with the clamping jaw 6 and the contact areas 9, 13 is to be shifted by a distance 29 in relation to the base unit 16, the intermediate plate 20 originally fitted is removed and replaced by a replacement intermediate plate 20'. This replacement intermediate plate 20' may have the same configuration as the original intermediate element 20, except for the position of the second set of locating holes 123', which are offset by the required distance 29 in relation to the original second set of locating holes 123 (which are indicated by a dashed line in FIG. 2d). If the carrier plate 5 is then bolted to the stop plate 18 of the support element 17 using the replacement intermediate plate 20', the offset 29 of the second set of locating holes 123' produces a corresponding offset of the carrier plate 5 in relation to the support element 17. In order to ensure that the fixing bolts 19 may be passed through the through-holes 25, 125 into the tapped holes 26 even when the carrier plate 5 is offset, the diameter 30, 130 of the through-holes 25, 125 may be made distinctly larger than the diameter 31 of the tapped holes 26.

In the case of the clamping mechanism 4 according to the present invention, the support element 17 is arranged as a standard part, the stop plate 18 of which has a fixed pattern of first locating holes 21. This standardized support element 17 may be combined with intermediate plates 20, 20' and carrier plates 5 of any configuration, in order to obtain clamping elements 4 for different clamping functions. In this case, it may be provided to keep a set of intermediate plate blanks, which is already provided with the through-holes 125 and the first set of locating holes 121. If a carrier plate 5 needs to be displaced by a certain distance or angle in relation to its support element 17, such an intermediate plate blank may only need to be provided with a correspondingly sited second set of locating holes 123, 123', which may be quickly and easily made. Alternatively, a modular system of different intermediate plates 20, 20' may be provided, on which the various offsets of the second set of locating holes 123, 123' are made. The carrier plates 5 themselves are single fabrications, which are adapted to suit the respective application.

The attachment according to the present invention of the carrier plate to the support element may allow great flexibility (due to the individual configuration of the carrier plate specific to the application), and at the same time may permit rapid and cost-effective adjustment of the position of the contact areas 9, 13 (through the use of standardized identical parts and their individual positioning by locating pins).

In addition to the patterns of locating holes 21, 23 each including two individual holes as illustrated in FIGS. 2a to 2d, the first and the second set of locating holes may include any number and arrangement of locating holes.

Figure 2E:
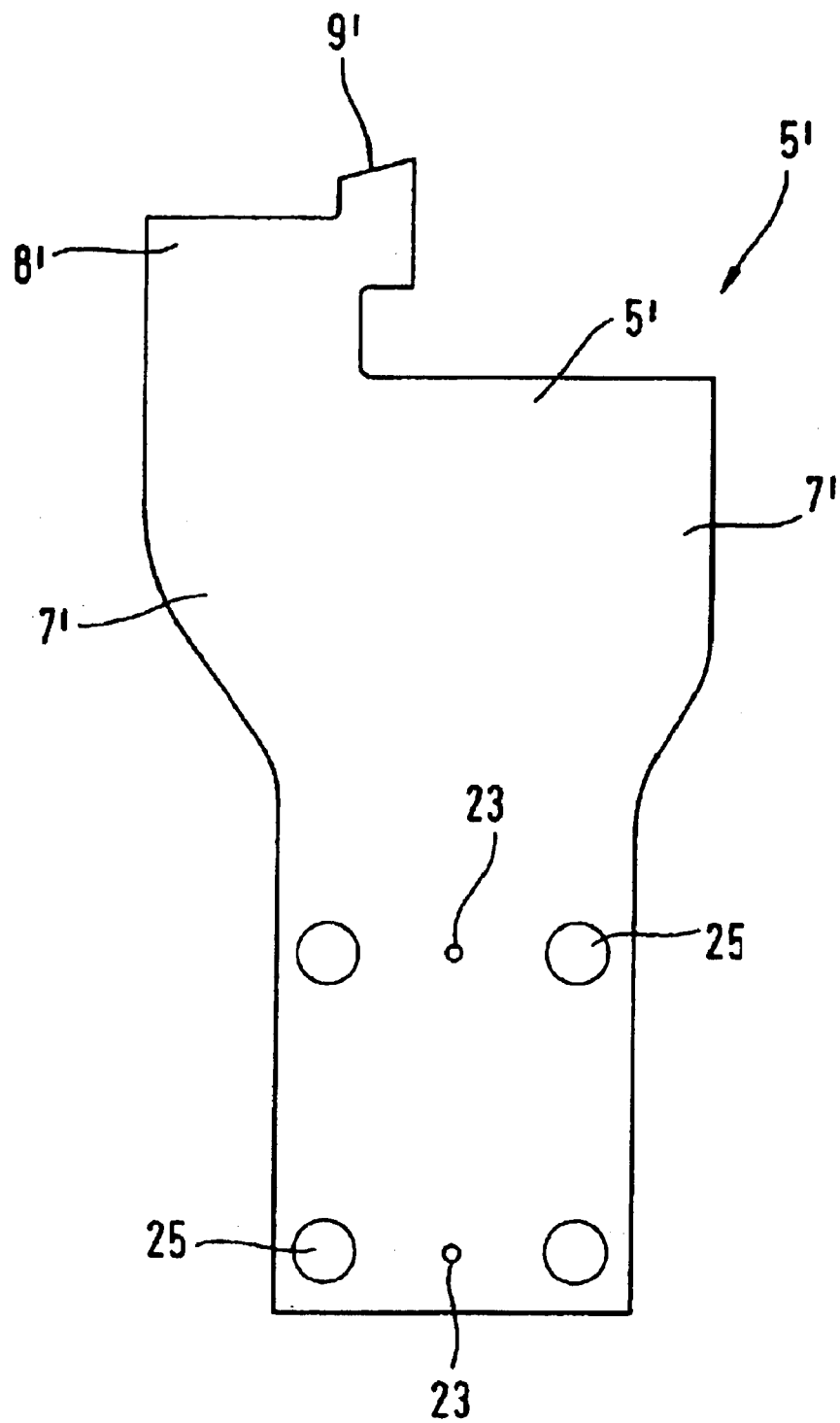
FIG. 2e illustrates an aspect of an alternative arrangement of the carrier plate.

FIG. 2e illustrates an alternative exemplary embodiment of the carrier plate 5' for a clamping unit 4 according to the present invention. The carrier plate 5' is of one-piece configuration, so that the contact area 9' is directly part of the actual body 7'. Such a carrier plate 5' may be manufactured very quickly and inexpensively, by laser cutting, for example, from a plate-shaped semi-finished product of the required material thickness. A clamping unit having such a single-piece carrier plate 5' may be well-suited to the clamping of components for the manufacture of prototypes, in which the shape and position of the components 2, 2' to be joined has not yet been finalized. Should major modifications be made to the position and shape of the components 2, 2' to be joined (which may not be compensated for by changing the intermediate plate 20), it is possible by computer-assisted laser cutting, for example, to quickly produce a replacement carrier plate 5', the stop areas 9' of which are adapted to the new position and shape of the components 2, 2'. Furthermore, in the event of damage, etc., to a carrier plate 5', a replacement part may be produced quickly and cost-effectively.

While the clamping unit 4 illustrated in FIG. 1 has only a single pair of corresponding contact areas 9, 13, multiple contact areas (in any alignment with one another and possibly closed by different clamping jaws) may also be provided on the clamping unit, which are all connected to the carrier plate 5, 5' via carrier members 10 and are therefore displaced together when the carrier plate is displaced or rotated through the use of another intermediate plate.

What is claimed is:

1. A clamping mechanism for locating and clamping sheet metal components to be subjected to a machining process, comprising:

a fixed support element;

a carrier plate including a first contact area configured to support the sheet metal components in a machining position, the carrier plate connected to the fixed support element by fixing bolts;

a carrier member connected to the carrier plate;

a clamping jaw rotatably fixed to the carrier member and including a second contact area configured to clamp the sheet metal elements to be subjected to the machining process, the clamping jaw movable between:

a clamping position in which the first contact area of the carrier plate is adjacent to the second contact area of the clamping jaw and in which the first contact area and the second contact area are arranged to interact to clamp the sheet metal components therebetween; and an opening position in which the first contact area of the carrier plate is distanced from the second contact area of the clamping jaw; and an intermediate plate arranged between the carrier plate and the support element, the intermediate plate positioned relative to the carrier plate by a first set of locating pins and positioned relative to the support element by a second set of locating pins.

2. The clamping mechanism according to claim 1, wherein the machining process includes a welding process.

3. The clamping mechanism according to claim 1, wherein the carrier plate is formed of a plate-shaped semi-finished product by laser cutting.

4. The clamping mechanism according to claim 1, wherein the carrier plate includes a two-piece configuration having a body and a clamping element bolted to the body; and wherein the clamping jaw includes a two-piece configuration having a body and a clamping element bolted to the body.

5. The clamping mechanism according to claim 3, wherein the carrier plate includes a two-piece configuration having a body and a clamping element bolted to the body; and wherein the clamping jaw includes a two-piece configuration having a body and a clamping element bolted to the body.

* * * * *